Patented Mar. 3, 1931

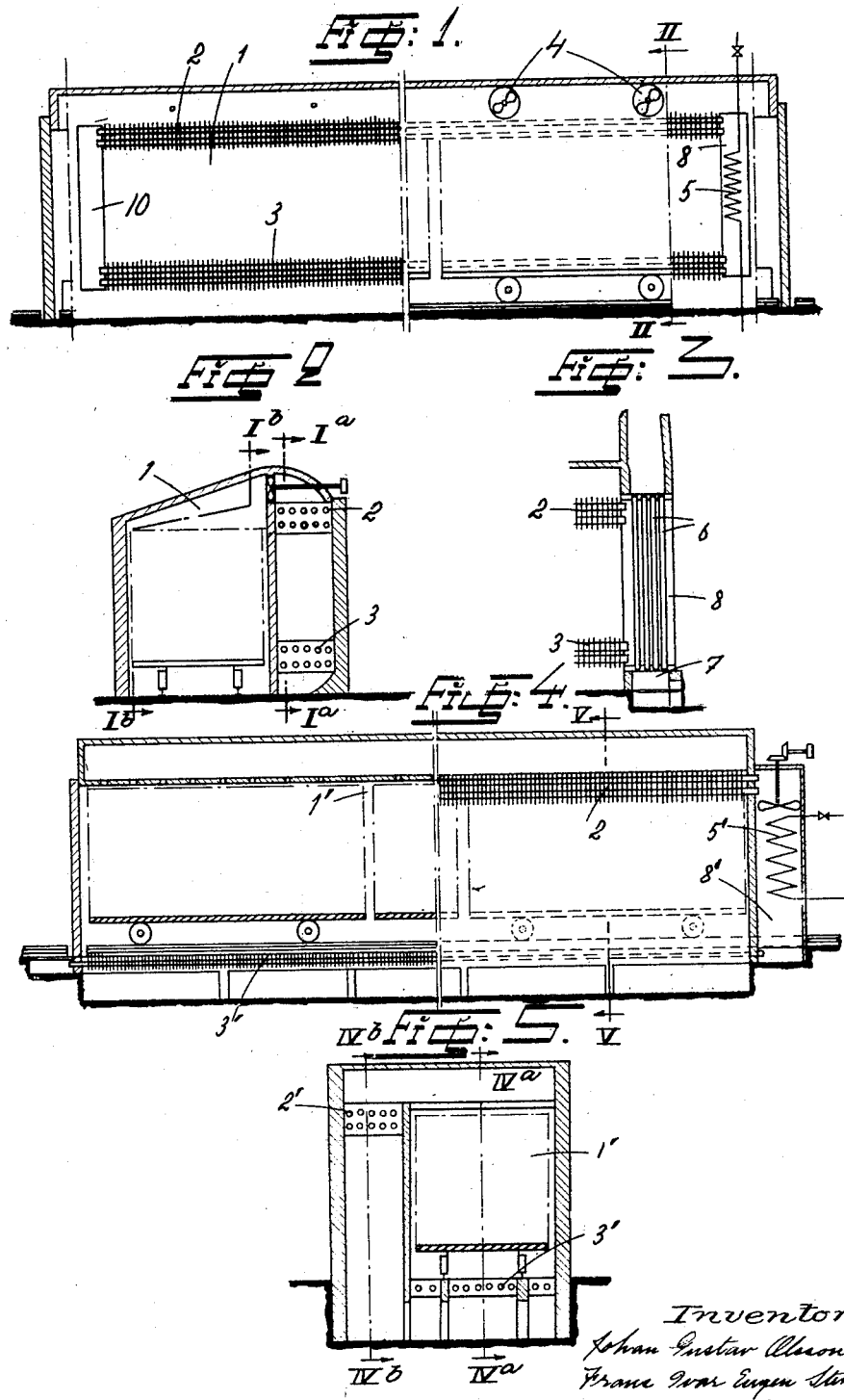

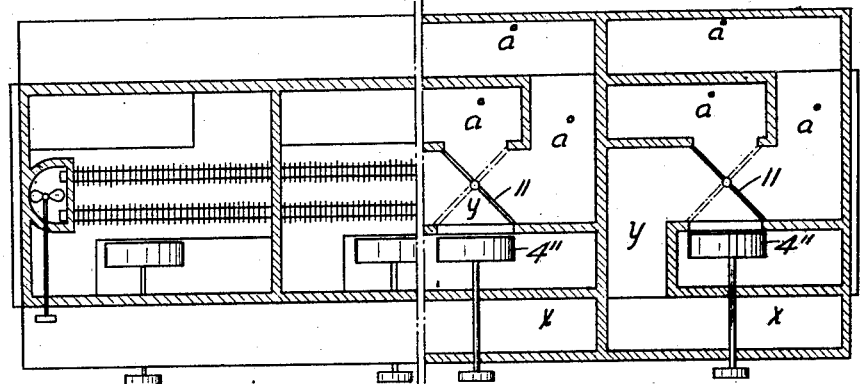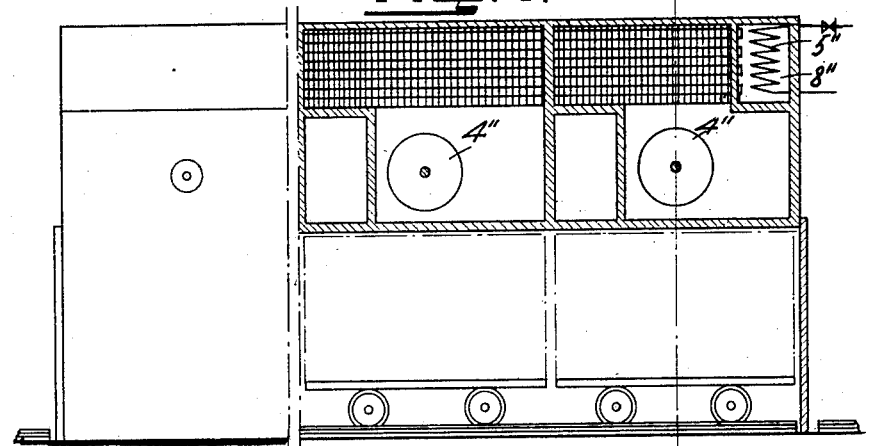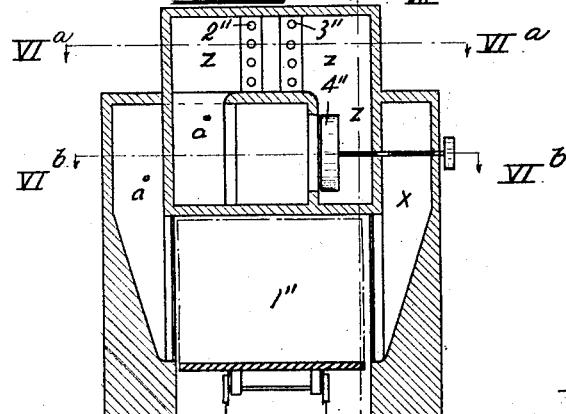

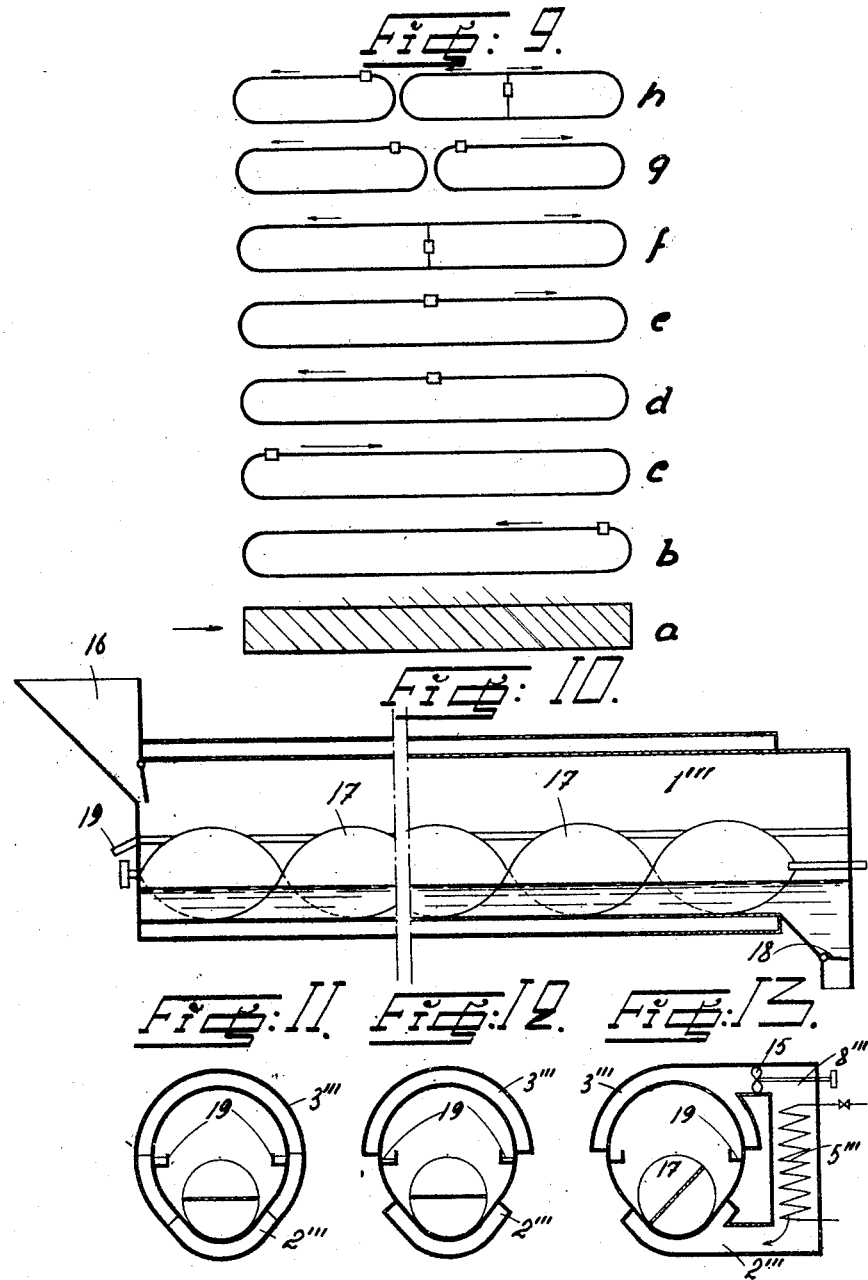

1,795,094

UNITED STATES PATENT OFFICE

JOHAN GUSTAF OLSSON, OF LIDINGON, AND FRANS IVAR EUGÉN STENFORS, OF ALSTEN, SWEDEN

APPARATUS FOR ALTERNATELY HEATING AND COOLING CIRCULATING DRYING MEDIUMS DURING DRYING BY MEANS OF THE SAME

Application filed May 29, 1928, Serial No. 281,554, and in Sweden October 31, 1927.

This invention relates to the working of such drying plants, where the drying is caused by the heat being supplied to the object to be dried either by bringing the object to be dried into direct contact with heating surfaces, or by a drying medium (for instance air and/or steam) transferring heat from heating surfaces to the material to be dried, and where the evaporated water is condensed in the drying room on cooling surfaces. It relates further to a method for regaining the condensation heat of the steam and the heat, which is obtained by the cooling of the steam, the condensed water and the drying medium to alternately heat and cool the drying medium and the steam. In accordance with this method one and the same medium, separate from the drying medium, alternately serves as heating medium for the heating surfaces and as cooling medium for the cooling surfaces in one and the same circulation system.

By hitherto known drying plants of this kind the heating means for the heating surfaces and the cooling means for the cooling surfaces form separate systems which are driven each separately. In these plants great losses are caused thereby, that those amounts of heat, which are bound by the cooling medium at the condensing of the steam, escape with this cooling medium. As the amount of heat of generation of steam is, as known, about five times as great as that amount of heat which is needed for heating water up to the boiling point, the greatest part of the heat consumed in the drying plant is evidently used for the evaporation itself. As further all or at least the greatest part of this heat of evaporation afterwards is delivered to the cooling medium, it is easily understood what considerable loss of heat there is. Even by the most suitable drying plants of this kind, where the losses by radiating and by heat escaping together with the dry material and the water of condensation are reduced as much as possible, there is a heat consumption which corresponds to over one kg. steam per kg. water driven out of the drying material. This considerable use of steam, or use of heat, is without doubt explained through the loss of heat by the cooling medium pointed out in the foregoing.

By this invention however, this is reduced to a minimum. The heat used for evaporation is regained successively in such a way, that one and the same medium may serve now as heating medium for the heating surfaces and now as cooling medium for the cooling surfaces. The medium after being heated, passes through pipes belonging to the heating surfaces, from warmer to successively colder parts of the drying room, whereby, on account of its greater temperature in relation to every part, it gives heat to the respective parts. Having reached the coldest part of the room, where it is contingently further cooled, it passes as cooling medium in pipes belonging to the cooling surfaces, from cooler to successively warmer parts of the drying room, whereby, on account of its lower temperature in relation to every part, it takes heat from respective parts and forms more and more water, until it finally reaches the warmest part of the drying room, where it is further heated and passes into the pipes of the heating surfaces, whereafter the process is repeated. The idea is thus that the heating medium will circulate in a closed system within the likewise closed drying room. Theoretically therefore the losses of heat in a plant driven according to this invention ought to be able to be reduced to the amount of heat which is lost through heat transmission and with the outgoing drying material and the condensed steam. Rationally adapted, the invention thus intends a considerable improvement in the question of making cheaper the working of drying plants, which is important not only within the limits where one is principally restricted to artificial drying, for instance in textile, paper, pulp, paper and pottery industries but also where one until now for economical reasons could not advantageously make use of artificial drying, for instance for making dry fuel out of very wet raw products, such as peat, saw-dust and the like. Also within timber industries and farming the invention is of great importance, because here a cheaper artificial drying, particularly for countries with damp climates, is

In the accompanying drawings are shown as examples some arrangements for the method in question.

Fig. 1 shows a longitudinal section taken substantially on the lines Ia—Ia and Ib—Ib of Fig. 2, looking in the direction of the arrows, and Fig. 2 shows a cross section taken substantially on the line II—II of Fig. 1, looking in the direction of the arrows.

Fig. 3 shows a detail of one means for heating the heating medium.

Figs. 4 and 5 show another embodiment, where Fig. 4 shows a longitudinal section taken substantially on the lines IVa—IVa and IVb—IVb of Fig. 5, looking in the direction of the arrows, and Fig. 5 a cross-section taken at the line V—V of Fig. 4, looking in the direction of the arrows.

Figs. 6, 7, and 8 show a third embodiment, where Fig. 6 is a horizontal section taken substantially on the lines VIa—VIa and VIb—VIb of Fig. 8, looking in the direction of the arrows, and Fig. 7 is an elevation partly in section, said section being taken at the line VII—VII of Fig. 8, looking in the direction of the arrows. Fig. 8 shows a cross section, taken along the line VIII—VIII of Fig. 7, looking in the direction of the arrows.

Fig. 9 shows various circulation schemes for the heating or the cooling mediums respectively.

Fig. 10 shows a longitudinal section and

Figs. 11, 12 and 13 show cross sections at different points of a fourth embodiment.

The drying room itself is in the nature of an elongated chamber 1, 1', 1'', 1''', through which the material to be dried is transported on cars or in any other convenient manner from one end to the other. Along this chamber, in the embodiment represented in Figs. 1–13, are arranged heating pipes 2, 2', 2'', 2''', as well as cooling pipes 3, 3', 3'', 3''', which are placed in such a way that the drying air, driven by gravity or by one or several ventilators 4, 4'' or the like, circulating in planes, which are substantially at right angles to the longitudinal direction of the dryer, passes the heating pipes, the material to be dried, the cooling pipes and back to the heating pipes. These are connected with the cooling pipes in both ends of the dryer, whereby one obtains one or several circulation conductors through which the medium serving for heating as well as cooling, either circulates itself or is driven by a pump, ventilator or the like and that heat by steam, smoke gases or the like is supplied to the medium going into the heating pipes. For the heating of the heating medium the dryer can be provided with, for instance, one or several pipe spirals 5, 5', 5'', 5''', Figs. 1, 4 and 7, or a tube system for smoke gases, as shown in Fig. 3. The tubes are there indicated by 6 and the fireplace by 7. In both cases the heating takes place in a passage 8, 8', 8'', 8''', which forms the connection between the cooling pipes and the heating pipes. As a heating medium one can use air, water, water mixed with other mediums et cetera.

The heating arrangement for the heating medium can be placed in different positions in the drying plant. For making this clear, one is referred to Fig. 9, where the drying room is indicated diagrammatically by *a* and the receiving end by an arrow. The heating arrangement, indicated by a small rectangle, can be placed at the end for taking out the dried material (scheme *b*), whereby the heating pipes stretch to the opposite end in the dryer and the cooling pipes from this end back to the end for taking out the dried material. The plant, made in such a way, is shown in Fig. 1, where the receiving end is to the left. The arrangement can reversely be placed near the end for receiving the material to be dried (scheme *c*), whereby the heating pipes extend towards the opposite end of the dryer and the cooling pipes extend from this end back towards the end for receiving the material to be dried. Further, the arrangement can be placed near the middle in the dryer, whereby the heating pipes extend either towards the receiving end for the material to be dried (scheme *d*) or towards the taking out end (scheme *e*), whereby in the first case the cooling pipes run from the end for receiving the material to be dried to the end for the taking out of the same and from there to the heating position or in the other case, in exactly the opposite direction. One can also arrange two or more circulation systems for heating and cooling in the same dryer, whereby these can have a common or separate heating arrangement or positions (scheme *f*, or *g* respectively) or both (scheme *h*).

The circulation system can be arranged either open, that is to say by one or several conductors being connected with the atmosphere, or closed. In the former case the advantage is that the temperature of the heating medium, when this is a liquid, is limited upwards by the boiling point of the liquid at atmospheric pressure. In the latter case the advantage is, that the temperature also at the using of liquid as heating medium can be raised above the boiling point at atmospheric pressure. In order that one may lower the temperature of the cooling medium when necessary, it is suitable to provide the circulation system with an inlet and an outlet. Further one can provide the circulation system with a cooling arrangement at a suitable point of the circulation conductor, where the circulating medium is indirectly cooled by a colder medium in order that thereby the temperature of the cooling, circulating medium may be lowered. Such a cooling arrangement can be arranged for instance at 10 in Fig. 1, thus being at the coldest place of the circulation conductor.

As already mentioned, the drying air must circulate in such a way that it passes in the direction from the heating pipes past the material to be dried to the cooling pipes. By the dryers shown in Figs. 1, 2, 4 and 5 one can by means of ventilators or the like reverse the direction of circulation of the drying air, if one at the same time alters the direction of circulation of the heating medium in such a way, that the heating pipes are changed to cooling pipes and the cooling pipes to heating pipes. By the plants shown in Figs. 6, 7 and 8 such an arrangement is made, that by the replacing of the shutter 11 one can reverse the direction of the drying air without altering the direction of circulation of the heating medium. Here the drying air can be led through special passages two different ways through the dryer by means of the shutter 11 and ventilators 4″, which are arranged in these passages. With that shutter position, which is shown with full drawn lines in Fig. 6, the drying air passes from the drying room 1″ by the way $x$ (Fig. 8), $y$ (Fig. 6) through the ventilator 12, further upwards through the way $z$ past the cooling pipes 3″ and the heating pipes 2″ (Fig. 8) down on the other side of the shutters and back to the drying room through the way $å$. At the changing over of the shutter to the position shown with dash-dot lines the air goes on the contrary the opposite way through the drying chamber but in the same direction passes the pipes 3″ and 2″. In order to prevent a possible self circulation in the lengthwise direction of the drying chamber, the latter can be divided by means of screens at a suitable distance from each other.

By the embodiment shown in Figs. 10–13 the drying chamber 1‴ is tube-shaped and the walls themselves formed into pipes 2‴ and 3‴ for the heating or cooling medium respectively and thus themselves form the necessary heating and cooling surfaces in the chamber. By means of a propelling device 15 the heating medium is driven in the direction indicated by the arrow past the heating device which is also indicated here by a pipe spiral 5‴ placed at the end of the drying chamber opposite the receiving end. In this end the heating and cooling pipes are joined (see Fig. 11). This drying arrangement is intended for drying material in the form of powder, grain or the like, for instance sawdust. For this reason it is provided at the receiving end with a filling funnel 16 and a transporting screw 17 by means of which the drying material is transported to the end for taking out the same.

In the outlet a shutter 18 is arranged. The water condensed by the cooling surfaces runs away in grooves 19.

Having now described our invention, what we claim as new and desire to secure by Letters Patent is:

1. A drying plant of the character described comprising an elongated drying chamber, a drying medium therein, and an endless heating and cooling system adapted to act upon said chamber and medium, said system including two conduits extending longitudinally through the length of the chamber, said conduits being in communication at both ends of the chamber, and through which conduits a circulating medium separate from said drying medium passes, means for heating said circulating medium, means for passing said circulating medium through one of said conduits in one direction in order to heat successively cooler portions of said first conduit, whereby successively cooler portions of said drying medium therealong are heated, and for passing said circulating medium back through the second of said conduits in the opposite direction to that in which the medium is passed through said first conduit in order to cool successively warmer portions of said second conduit, whereby successively warmer portions of said drying medium therealong are cooled, and means for effecting circulation of said drying medium in contact with said conduits.

2. A drying plant in accordance with claim 1 including, means for moving the drying medium in a continuous cycle past the heated portion of the drying chamber, the material to be dried and the cooled portion of the drying chamber, the circulation of said drying medium being substantially in a plane at right angles to the longitudinal direction of the drying chamber.

In witness whereof, we have hereunto signed our names.

JOHAN GUSTAF OLSSON.
FRANS IVAR EUGÉN STENFORS.